Feb. 7, 1928.           1,658,708
J. M. DE ARÓSTEGUI E YBARGÜENGOITIA
PNEUMATIC TIRE AND WHEEL THEREFOR
Filed Aug. 5, 1925
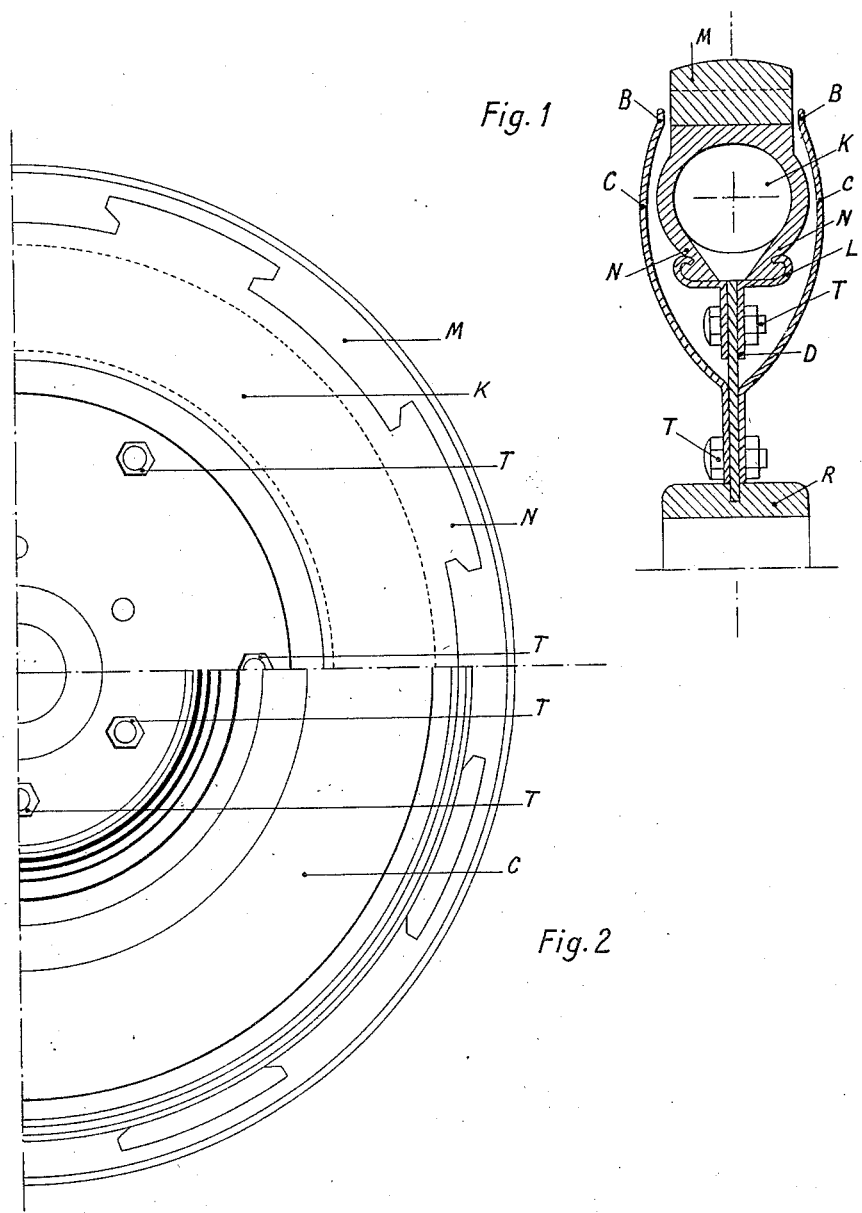
Inventor
J. M. de Aróstegui e Ybargüengoitia
by Langner, Parry, Card & Langner
Attys Patented Feb. 7, 1928.

1,658,708

UNITED STATES PATENT OFFICE.

JOSÉ MANUEL DE ARÓSTEGUI É YBARGÜENGOITIA, OF BILBAO, SPAIN.

PNEUMATIC TIRE AND WHEEL THEREFOR.

Application filed August 5, 1925, Serial No. 48,332, and in Spain March 28, 1925.

This invention relates to pneumatic tires and wheels therefor and has for its chief object to provide an improved tire such that the tread can be replaced when desired.

Many methods for overcoming the disadvantages pertaining to the use of pneumatic tires on the wheels of motor vehicles have been suggested, but none has proved successful. The disadvantages consist mainly in the possibility of the puncturing or bursting of the tire, which naturally cannot occur in material that, by its nature, cannot be deflated nor is liable to burst. Accordingly, it is in the use of means of this kind that a substitute has been sought for pneumatic tires. The methods that dispense with pneumatic tires, however, apart from having defects of their own, lack certain qualities inherent in the latter, such as elasticity, due to the air they contain, which no solid material can offer in the same degree.

Thus, if pneumatic tires were not liable to punctures and bursting with the trouble—not to mention the accidents—thereby entailed, it might be said that the ideal had been reached in this matter.

The mishaps mentioned are generally rare in pneumatic tires that are new, provided they have been properly fitted, for their tread is then at its maximum thickness. As the tire becomes worn with use, the chances of these mishaps occurring increase, for it is easier when they are somewhat worn, for any pointed or sharp-edged body to penetrate through them and cause a puncture or for them to burst as a consequence of the reduced resistance they offer to the expansion of the air enclosed in the inner tube, which expansion is due to the increase in temperature of the air by reason of the heat developed by the friction of the tire against the road surface, the spread of which tire cannot be prevented by the small amount of rubber on the worn-out cover, which rubber is in itself a bad conductor of heat. Bursting may also be due to the fact that the outer cover, upon being worn away, gets torn, which leads to sudden ruptures in the inner tubes and thereby to their bursting.

The disadvantages inherent in tires at present in use are overcome according to a feature of the present invention by the provision of a pneumatic tire having a detachable tread portion. The tread portion is preferably an annular band of rubber or other suitable material provided on its inner periphery with tooth members adapted to interlock with corresponding members on the outer periphery of the tire.

A further feature of the invention consists in the provision of a vehicle wheel for use with the improved tire and provided with means for preventing lateral displacement between the parts of the tire.

In order that the invention may be more clearly understood and readily carried into effect reference may now be had to the accompanying drawing in which a preferred embodiment of the invention is illustrated and in which:—

Fig. 1 is a sectional view of the improved tire and wheel and

Fig. 2 is an elevational view of the improved tire and wheel.

To the hub R of the wheel is attached the disc D having a rim L, into which the pneumatic tire casing N is fitted in the usual manner. The casing N is provided interiorly thereof with the inner tube K adapted to contain air at suitable pressure. Attached to the casing N by means of crowns provided with teeth—as may be seen in Fig. 2—is a solid tread portion M, the outer surface or tread of which may be provided with any of the non-skid devices commonly used. The teeth may be arranged in any manner, the manner shown having been adopted, since it prevents any separation between the two crowns provided with teeth such as might be produced by the centrifugal force created upon movement of the wheel.

A similar purpose is served by the side guards C, one at either side of the wheel, which prevent by means of edges B lateral displacement, with regard to the axle of the wheel of the outer rim or tread M with respect to the casing N. The edges B are located opposite the toothed coupling, but in such a manner that they do not reach to the ground when the tire is compressed by a load. The covering pieces C may be either full or perforated, as considered most convenient.

In order that the wheel may be fitted to any kind of vehicle, the disc D need not be attached to the hub, but may be connected by means of bolts, or any other means, to the plate centres of the axles thus arranged. It may also be replaced altogether by a spoke wheel of suitable material.

As will be gathered from the above, the fundamental part of the invention lies in the provision of a pneumatic tire having a detachable tread portion and it may, therefore, be applied to any of the wheels at present in use.

The arrangement shown has been chosen for the sake of clearness and because it appears the most suitable and economical when a new wheel has to be made. The rim L is preferably formed of angle irons attached to the disc D by through-bolts T so as to facilitate the fitting-on of the pneumatic tire and for the same reason, the side guards C are connected to the disc by bolts of the same kind T.

Should the tread become worn by use, it can easily be replaced by a new one, while retaining the same casing, or vice versa.

For transport use in war time, the system has the advantage that, as the casing is capable of being protected by the side guards or sheaths, it is rendered immune laterally from the effects of shots.

What I claim is:—

1. In combination, a wheel and a pneumatic tire mounted thereupon, said tire including a laterally displaceable tread, and means carried by said wheel to prevent inadvertent lateral escape of said tread, said means being normally out of contact with said tire.

2. In a pneumatic tire, a casing having spaced peripheral projections extending transversely thereacross, said projections being undercut to form transverse recesses at the front and rear, and a detachable tread fitting the periphery of said casing having projections corresponding to the spaces between the peripheral projections of said casing provided with flanges dovetailing into the transverse recesses to prevent radial separation of said casing and tread by centrifugal force or the wave-like stretching incident to the tractive thrust of the tire, the dovetailing portions being of trapezoidal cross section whereby acute angles are avoided.

In testimony whereof I have signed my name to this specification.

JOSÉ MANUEL de ARÓSTEGUI é YBARGÜENGOITIA.